Dec. 28, 1965    H. E. OSMENT ETAL    3,226,191
METHOD OF PRODUCING ACTIVE ALUMINA AND THE RESULTING PRODUCT
Filed March 15, 1965    2 Sheets-Sheet 1
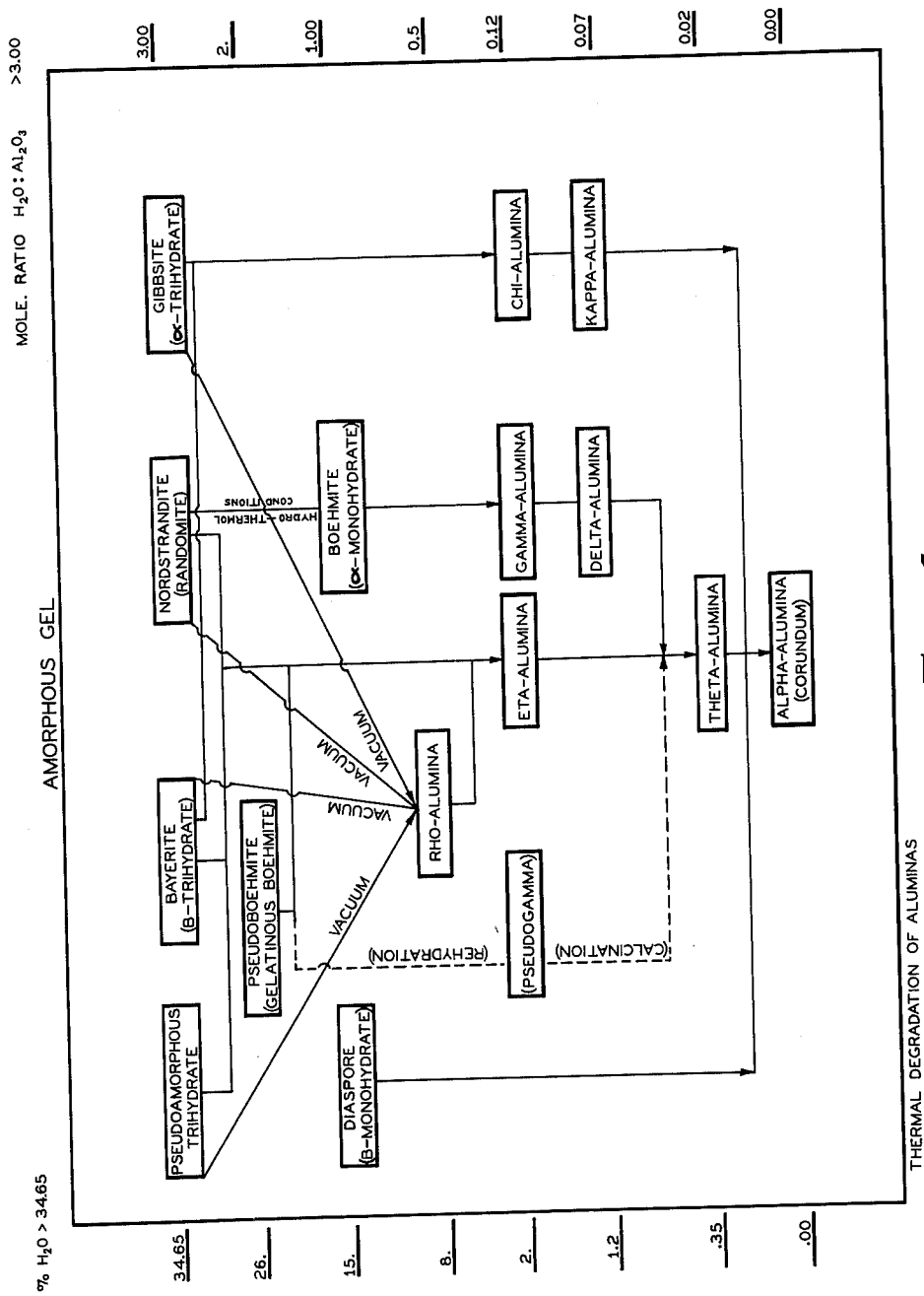
Fig_1_
INVENTOR.
HARRY E. OSMENT
ROBERT L. JONES
BY
James E. Toomey

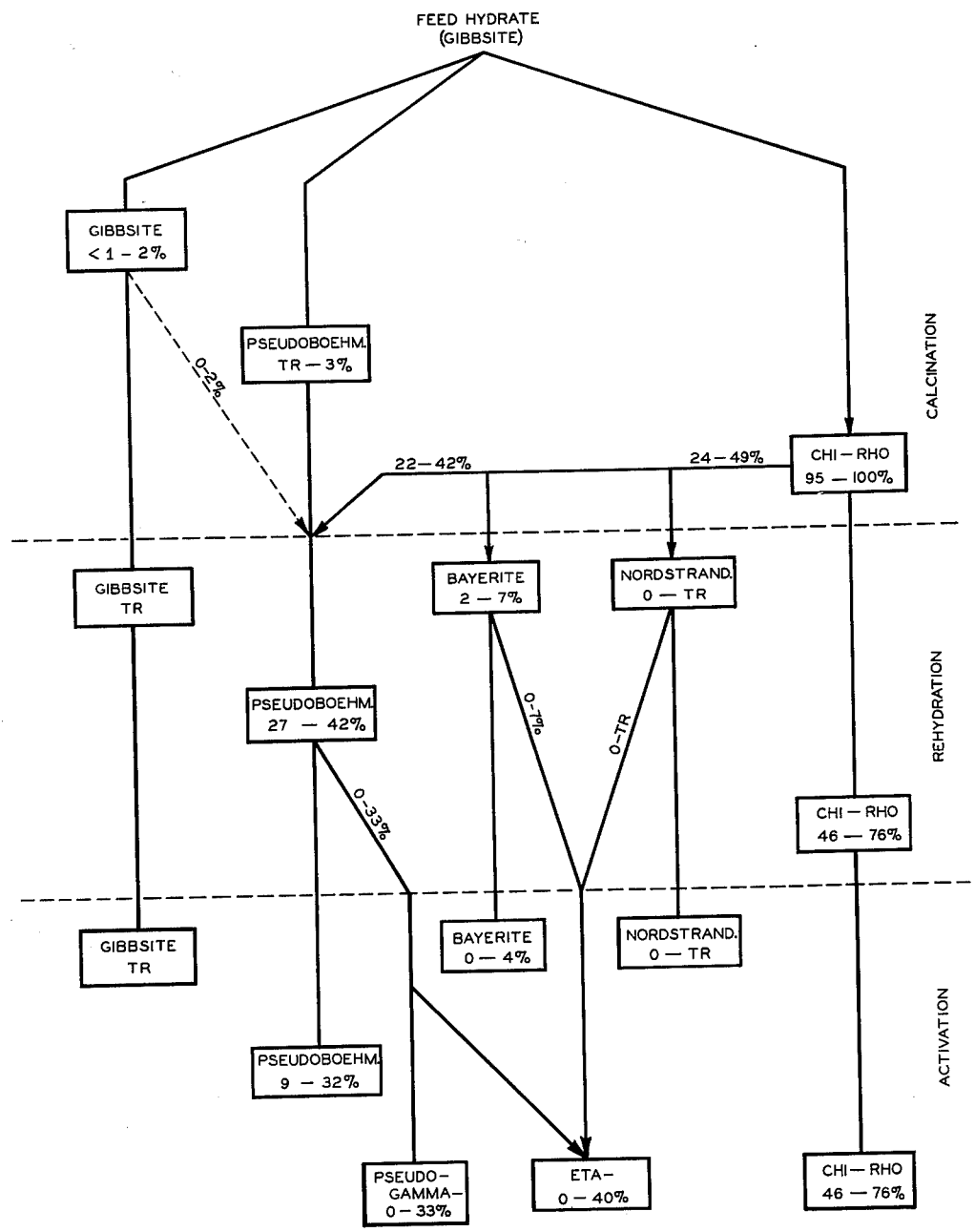
SIMPLIFIED DISTRIBUTION OF PHASES
Fig_2_
INVENTOR.
HARRY E. OSMENT
ROBERT L. JONES

United States Patent Office 3,226,191
Patented Dec. 28, 1965

3,226,191
METHOD OF PRODUCING ACTIVE ALUMINA AND THE RESULTING PRODUCT
Harry E. Osment and Robert L. Jones, Baton Rouge, La., assignors to Kaiser Aluminum & Chemical Corporation, Oakland, Calif., a corporation of Delaware
Filed Mar. 15, 1965, Ser. No. 439,616
8 Claims. (Cl. 23—141)

This is a continuation-in-part of application Serial No. 192,318 filed May 4, 1962 and now abandoned.

The present invention relates to a method of producing active alumina of high adsorption capacity and the active alumina so produced. More particularly, the invention relates to a method of producing active alumina possessing high adsorption capacity and other desirable properties for desiccant and other applications and the active alumina so produced.

The use of solid adsorbents to recover hydrocarbons, particularly natural gasoline, from natural gas has become of major importance in recent years. In addition to the requirement of high adsorption capacity and selectivity (primarily paraffinic selectivity) for hydrocarbons of a five carbon chain (pentanes) and higher, adsorbents should possess the ability to release the hydrocarbons readily during regeneration of the adsorbent. Good physical strength and thermal stability are also desirable and will aid in prolonging the life of the adsorbent. A low specific heat will enable short regeneration periods requiring less heat and lowering the cost of regeneration. The configuration of the hydrocarbon recovery absorbent should be such as to provide a low resistance to flow. The chemical stability must be good enough so that it will not react with or fracture in a liquid environment. Of course, the most important quality in a good hydrocarbon recovery adsorbent is the ability to yield high hydrocarbon efficiencies of recovery over the required adsorption periods.

In the past alumina adsorbents useful as desiccants were regarded as unsatisfactory for hydrocarbon recovery because of their low hydrocarbon adsorption capacity and the tendency for dusting which can cause stoppage of flow lines. Silica gels and silica-alumina adsorbents have previously been used primarily as the hydrocarbon adsorbents. The present invention enables the production of an active alumina useful as a hydrocarbon recovery adsorbent which possess very high hydrocarbon adsorption capacity in addition to satisfying the other physical and chemical requirements.

Active alumina adborbents have been used primarily as desiccants and have been made by calcining alumina trihydrate, grinding the calcined alumina, nodulizing the ground material into substantially spherical configurations, rehydrating the ground nodulized alumina to cure by holding in the presence of air for a period of time, usually on the order of several days or a week, and finally, activating the cured particles by heating. The present invention involves the discovery that by establishing critical curing conditions for the nodulized alumina it is possible to obtain an active alumina product having greatly increased adsorption capacity. Moreover, by combining the critical curing conditions with certain activation conditions it is possible to obtain an active alumina product of still greater adsorption capacity.

FIGURE 1 shows some of the transition aluminas resulting from calcination fo four different alumina trihydrates. With the exception of pseudogamma the phases shown and nomenclature used in FIGURE 1 are well known in the alumina field. See, for example, "Technical Paper No. 10 (revised) Alumina Properties" by Allen S. Russel et al., Aluminum Company of America, 1956. The pseudogamma phase has not been reported in the published literature as such but has been found and named by X-ray diffraction investigators at Kaiser Aluminum & Chemical Corporation. Pseudogamma is different in structure and physical properties from any of the alumina phases previously reported in the field. Discussion of the gamma alumina and eta alumina phases is found in "X-ray Studies of Activated Aluminas I. Eta and Gamma Aluminas" by R. A. Van Norstrand, Sinclair Research Laboratories, Inc., reprint of a paper given at American Chemical Society Meeting, 1956; "Structural Interpretation of the Diaspore, Corundum and Boehmite-Gamma $Al_2O_3$ Transitions," by G. R. Ervin, Jr., Acta Cryst. 5 103–8 (1952); "Structures of Gibbsite and Intermediates During Dehydration" by H. Saalfeld, N. Jahrbuch F. Mineralogie, Abhandlungen 95 (1), 1 to 87 (1960). With reference to this literature, the phase designated as pseudogamma could not be identified as either gamma or eta alumina. The diffraction lines exhibited the relatively low intensity: width ratios and the low intensity of the (222) reflection, as compared to the (311), that is recognized on X-ray diffraction patterns from eta alumina. However, the (311) line was very poorly developed and the (111) line was lacking. Very good development of the (311) line and the (111) line characterizes eta alumina. Similarly, the very high specific surface reported for eta (400 to 550 m.$^2$/g. was not obtained from the phase designated as pseudogamma, but the surface area was several times that which has been reported for gamma alumina. FIGURE 1 shows the sequence of progressive calcination of each of the hydrates, all having alpha alumina as the final end product of calcination. With the exception of alpha alumina, all phases below the monohydrate aluminas can be described as transition aluminas. The designation "gamma alumina" has been used sometimes in industry as a generic term meaning a mixture of transition aluminas.

FIGURE 2 shows schematically the probable distribution of phases during the process of the present invention. In each box there is shown the approximate range of phase concentrations as determined by X-ray diffraction analysis.

The process according to the invention, with reference to FIGURES 1 and 2, comprises selectively calcining an alumina trihydrate, for example, gibbsite alumina such as is obtainable from Bayer plant processing to produce a transition and amorphous alumina comprising in excess of about 95% chi-rho alumina, not more than about 3% pseudoboehmite alumina, not more than about 1% gibbsite alumina and capable of at least partial rehydration. Advantageously, the alumina trihydrate is selectively calcined to a loss on ignition of approximately 5 to 10%. The calcination may be accomplished by passing the alumina trihydrate through hot gases of about 1300° to 1400° F. It is believed that the immediate surface layer of the gibbsite alumina is converted into essentially chi alumina, whereas the bulk of the interior material is converted into rho alumina. The pattern presented on X-ray diffraction analyses is such that the mixture is designated "chi-rho." The selectively calcined alumina, If desired, may then be ground to a suitable particle size distribution. After selective calcining and, if desired, grinding, the alumina is granulated or otherwise formed into agglomerates of desired configuration. The granulating or agglomeration can be accomplished by mixing the alumina with a small amount of water. The thus formed granules or agglomerates are cured by immersing in water for a period of time sufficient to partially rehydrate the alumina to produce a transition material comprising from about 46 to about 76% chi-rho alumina, from about 27 to about 42% pseudoboehmite alumina, from about 2 to about 7% bayerite alumina with not more than traces of gibbsite alumina and not more than traces of nordstrandite alumina. As used in this context rehydration is the phenomenon of combining molecules of water with alumina molecules. Hydration is the phenomenon of combining molecules of water with alumina molecules. During hydration, the water molecules apparently enter into the crystal lattice of the alumina, modifying sufficient of the alumina particles to form a firm mass. The temperature of the water may vary from room temperature to 212° F. Optimum conditions of curing are in water at a temperature in the range of 140 to 176° F. for about 8 hours. After curing the nodules are activated by heating to again obtain a transition alumina of large surface area comprising from about 46 to about 76% chi-rho alumina, from about 9 to about 32% pseudoboehmite alumina, not more than about 40% eta alumina, not more than about 33% pseudogamma alumina and not more than traces of gibbsite alumina. For example, activation can be performed by passing a stream of hot air or combustion gases through a bed of the cured agglomerates for a sufficient period of time, e.g., about one hour, to heat the agglomerates to a temperature in the range of 550 to 750° F. preferably 500 to 700° F. if the activated alumina is going to be used for hydrocarbon adsorption. If the activated alumina is going to be used as a desiccant, the activation temperature is preferably in the range of 700 to 850° F.

Various tests have been devised to evaluate adsorbents. The most satisfactory test from the standpoint of determining the hydrocarbon recovery adsorption capacity of particular adsorbents appears to be the "breakthrough testing" procedure. In this test a column is filled with the adsorbent agglomerates or particles and a gas comprised of a complex mixture of hydrocarbons is fed upwardly through the column of adsorbent. The adsorbent in the bottom of the column gets saturated first with each fraction of the hydrocarbon mixture. The saturation layer progresses upwardly through the adsorbent in the column as a wave of saturated material. If the column of predetermined length is established it is then possible to compare the relative adsorption capacities of different adsorbents by determining the length of time required for the wave of saturation to reach the predetermined length of column. The point at which the adsorbent becomes saturated with the particular hydrocarbon fraction of interest is referred to as the "breakthrough" point. At this point the adsorbent is no longer adsorbing the maximum amount of the particular hydrocarbon fraction. The longer the "breakthrough" time, i.e., the time required for the wave of saturation to saturate at the predetermined length of column, the more superior the adsorbent.

In the recovery of natural gasoline the hydrocarbon fractions of importance are those of the pentanes and heavier. Breakthrough times for various hydrocarbon fractions obtained with adsorbents made by different methods compared to adsorbents made according to the invention are shown in Table I. The dynamic conditions of testing adsorbents, the breakthrough times of which are tabulated in Table I, included a bed depth of 3.5 feet, flow velocity of 10 feet per minutes, a temperature of 60° F., and a pressure of 750 p.s.i.g.

Sample A was prepared by selectively calcining an alumina trihydrate, grinding the calcined alumina, nodulizing into spheres and curing by holding in the presence of air for the usual period of time and then activated at a conventional temperature of 705° to 800° F. Sample B was made the same way except that the nodues were cured according to the invention by immersion in water until the alumina was substantially totally rehydrated. Sample C was also prepared according to the invention and was similarly cured by immersion of the modules of alumina into water the same time, e.g., about 8 hours.

Samples B and C were, however, activated at different temperatures, sample B being activated at 750° F., and sample C being activated at 600° F; as can be seen, both samples B and C have better breakthrough times than sample A which was not cured according to the invention. However, it is noted that of the two samples cured according to the invention the sample activated at 600° F. demonstrated better properties and longer breakthrough times than the sample cured according to the invention but activated at 750° F. Thus, the tabulated results not only demonstrate the criticality of the curing condition according to the invention, but further illustrate the additional improvement which may be obtained by the combination of curing according to the invention and activation at relatively lower temperatures.

*Table I.—Hydrocarbon breakthrough times for various adsorbents*

| Adsorbent | Time at Breakthrough, Min. | | | |
|---|---|---|---|---|
| | $iC_5$ | $nC_5$ | $C_6$ | $C_{7+}$ |
| A ... ¼"×8 mesh, 750° F. Act. | <1 | 1 | 7 | 18 |
| B ... ¼"×8 mesh, 750° F. Act. | 1 | 3 | 8 | 19 |
| C ... ¼"×8 mesh, 600° F. Act. | 2 | 3 | 13 | 23 |

(Dynamic Conditions: Bed Depth—3.5 ft.; Flow Velocity—10 ft./min.; Temperature—60° F.; Pressure—750 p.s.i.g.)

It has also been found that in addition to the curing conditions and activation temperature, further improvement in hydrocarbon recovery adsorption capacity may be obtained by controlling the size of the adsorbent granules. Table II illustrates the effect of particle size and activation temperature on the hydrocarbon recovery adsorption capacity of active alumina nodules made according to the invention. In both cases (samples D and E) the hydrocarbon breakthrough times are recorded under the identical dynamic conditions of bed depth, flow velocity, temperature and pressure used in the tests for which the results are reported in Table I. Samples D and E are both 6x8 mesh. Sample D, however, was activated at 750° F. and sample E was activated at 600° F. By comparing the results of sample D with results of sample B, and sample E with sample C, it is seen that the nodule size has a decided effect on the breakthrough time of the adsorbents. Comparing sample E with sample D the additional improvement obtained by activating at 600° F. is illustrated.

*Table II.—Hydrocarbon breakthrough times for various adsorbents*

| Adsorbent | Time at Breakthrough, Min. | | | |
|---|---|---|---|---|
| | $iC_5$ | $nC_5$ | $C_6$ | $C_{7+}$ |
| D ... 6×8 mesh, 750° F. Act. | 4 | 8 | 13 | 27 |
| E ... 6×8 mesh, 600° F. Act. | 6 | 8 | 17 | 35 |

The "submerged curing" of the nodules according to the invention may be accomplished either continuously in a column or tower filled with water at the controlled temperature or batch-wise in a tank where water is maintained at the desired temperature by steam jacketing or by submerged coils. In column operation it has been found convenient to maintain temperature by circulating a stream of water through an external heat exchanger and then into a bed of the nodules. The overflow may be returned to the heat exchanger.

The phenomena by which the improved adsorption capacity is obtained by submerged curing is best explained with reference to FIGURE 2. As noted from FIGURE 2, the pseudoboehmite produced during calcination is augmented during rehydration by transformation of some of the chi-rho; large percentages (27 to 42%) are favored by high-temperature curing (<212° F.) and low pH. Most of the original chi-rho (46 to 76%) remains unchanged during the rehydration and activation steps; however, a small portion changes to bayerite (2 to 7%) and a trace of nordstrandite, with the change to bayerite being favored by high pH (>7) and low temperature (<176° F). The formation of pseudoboehmite which has fibrillar structure is believed to be largely responsible for the strength of the final product because it accounts for the majority of water of constitution in the product of the curing step although the trihydrates bayerite and nordstrandite also contribute.

If the curing temperature exceeds 212° F., pseudoboehmite is slowly converted to well crystallized boehmite. This detrimental transformation will go to completion within about two hours at 284° F. As noted in FIGURE 1, boehmite on activation is converted to gamma alumina, which has a far lower adsorption surface area and lower sorptive capacity than the eta and pseudo-gamma in the product resulting from the practice of the present invention. The freshly nodulized calcine is hot and continues to release heat from the exothermic rehydration reactions taking place. The higher sorptive capacities for the product resulting from the practice of the present invention are due to quenching the freshly nodulized material in water, thus avoiding an uncontrolled temperature excursion. The temperature of the water is controlled and the excess water tends to drive the rehydration and strength-forming reactions to completion, thus giving a final product having improved mechanical properties as well as increased sorptive capacity. Hence the temperature of water curing is desirably 140 to 176° F. in the present invention.

In the activation step the chi-rho alumina produced by calcination remains mostly unchanged. On activation, a considerable portion of the pseudoboehmite alumina is retained with the balance being transformed into pseudo-gamma alumina and eta alumina. This latter phase which is also produced by the thermal decomposition of the bayerite alumina is quite desirable in the final product and it is characterized by a very high surface area, catalytic activity and good thermostability.

The lower activation temperature bestows a further improvement in the hydrocarbon adsorption capacity because at lower temperatures the mean pore diameter of the alumina tends to be decreased which in turn increases the ability of the alumina to retain the heavy hydrocarbons, especially the $C_5$ and $C_6$ fractions. By utilizing the submerged water curing and a lower activation temperature, an active alumina can be prepared which possesses excellent hydrocarbon recovery adsorption capacity as well as the desirable properties of high attrition and abrasion resistance.

As indicated above, an additional improvement to the adsorption characteristics can be made by decreasing the size range of the nodules (from ¼" x 8 mesh) to 6 x 8 mesh. This increase in the available nodule surface serves to improve the mass transfer of the heavy hydrocarbons from the natural gas to the alumina. The improvement in mass transfer is particularly important in a system where the affinity between the adsorbent and the adsorbate is relatively low. Conversely, in dehydration the affinity of the alumina for water is high. Thus, time of contact between the moist gas and the alumina can be relatively short in order to achieve complete mass transfer.

Adsorbents used for hydrocarbon recovery adsorption must be capable of being regenerated upon saturation in order to comply with economic requirements. Regeneration of the adsorbent generally comprises heating the saturated adsorbent after use to boil and vaporize the hydrocarbon content. Typical regeneration techniques involve treating the adsorbent column either by passing heated gas through the column or by simply heating to cause the hydrocarbon in the adsorbent to vaporize and be removed from the adsorbent material, thereby leaving the adsorbent free of hydrocarbon and capable of reuse. After regeneration the adsorbent is cooled whereafter it may be used for further hydrocarbon recovery adsorption.

The ability of an adsorbent to be regenerated rapidly in as short a time as possible is a very desirable characteristic. The time required to regenerate an adsorbent depends upon the quantity of adsorbent and the mean specific heat of the adsorbent. The specific heat of the adsorbent made according to the invention compares very favorably with the best of existing adsorbents. Accordingly, the regeneration time for the active alumina adsorbent produced according to the invention is very good.

In addition to possessing superior properties with respect to hydrocarbon adsorption and regeneration, the active alumina adsorbent made according to the invention possesses improved strength and physical properties. Resistance to attrition and abrasion are properties extremely important where the adsorbent material is to be used in a bed or column. Table III compares the resistance to attrition and abrasion of an active alumina adsorbent made according to the invention in the laboratory with one made in the laboratory according to conventional desiccant manufacture practices. The sample F made according to conventional practice was cured in air and sample G was given the submerged curing according to the invention. As can be seen, the jet attrition loss and abrasion loss are significantly lower in the case of alumina adsorbent made according to the invention.

*Table III*

| Sample | Jet attrition loss, percent, (1) | Abrasion loss, percent, (2) |
|---|---|---|
| F | 37.3 | 2.8 |
| G | 6.7 | 0.8 |

(1) *Attrition loss.*—An activated sample of nodules is screened to obtain 30.0 grams in an appropriate size range, e.g., minus ¼" plus 8 mesh, minus 6 mesh plus 8 mesh, or minus 8 mesh plus 14 mesh. The sample is then transferred to a 1000 ml. standard Erlenmeyer flask which has a 1" diameter hole in the bottom thereof, said hole being covered with a screen of an appropriate mesh size (dependent upon size range of sample—10 mesh screen for minus ¼" plus 8 mesh sample, 14 mesh screen for minus 6 plus 8 mesh sample, and 18 mesh screen for minus 8 plus 14 mesh sample). A rubber stopper is inserted in the top opening of the flask, which stopper is penetrated with a metal air inlet nozzle with an inside diameter of 0.19". The flask is then inverted, fixed in this position, and connected to an air supply system. This system consists of an air pressure regulating system, downstream from a chamber containing a drying agent, and a rotameter, calibrated to pass 6.1 s.c.f.m. dry air.

Air is admitted to the test apparatus for a period of time, e.g., 30 minutes or 15 minutes depending on the size of the material being tested. When testing 6 x 8 mesh and 8 x 14 mest material, it is necessary to provide a small upward flow of 10 to 15% from the test equipment, when putting the flask on or taking it off the test stand; otherwise, some fines may be lost from the stopper outlet while the flask is in the inverted position.

Following the test, the material is screened on a screen of appropriate mesh size (10 mesh screen for ¼ inch x 8 mesh sample, 14 mesh screen for 6 x 8 mesh sample or 18 mesh screen for 8 x 14 mesh sample). The amount remaining on the screen is then weighed to the nearest 0.1 gram. The attrition loss is expressed as follows:

$$\text{Attrition loss, percent} = \frac{(30.0 - \text{final wt.})}{30.0} \times 100$$

(Mesh sizes are U.S. standard screen sizes)

(2) *Abrasion loss.*—A weighted amount of plus 28 material is tapped on a RO–TAP machine for 30 minutes. The percentage of material passing through the 28 mesh screen on tapping is recorded as the abrasion loss.

The active alumina adsorbent made according to the invention is additionally superior to conventionally produced desiccant grade active aluminas in water adsorption capacity. Table IV illustrates the water adsorption capacity of four samples made in the laboratory, two of which were cured by prior conventional air curing techniques, and the latter two of which were cured by immersion in water. All but sample 2 were activated at 600° F. The water adsorption capacity in percent by weight is tabulated for 20%, 40% and 60% relative humidity. As can be seen, samples 3 and 4 made according to the invention show superior water adsorption capacity in each of the categories.

*TABLE IV.—Water sorption capacities*

| Sample | | Water Static Sorption Capacity (Percent by Weight), (3) | | |
|---|---|---|---|---|
| | | 20% R.H. | 40% R.H. | 60% R.H. |
| (1) | 600° F. Act | 10.6 | 14.2 | 18.9 |
| (2) | 750° F. Act | 9.8 | 14.3 | 18.8 |
| (3) | 600° F. Act | 11.9 | 15.2 | 19.7 |
| (4) | 600° F. Act | 12.4 | 15.6 | 19.3 |

(3) *Static sorption at percent relative humidity.*—A weighed sample of the material is placed in a desiccator having suitable means for maintaining the relative humidity at the desired percent (for example, a reservoir of sulfuric acid which can be agitated). The sample is allowed to remain in the desiccator for a time sufficient for equilibrium to be achieved, e.g., 24 hours. The static sorption is obtained by the following equation:

$$\text{Percent static sorption at percent R.H.} = \frac{\text{adsorbed moisture weight}}{\text{active sample weight}} \times 100$$

The active alumina adsorbent made according to the invention is superior to conventionally produced desiccant grade active alumina even when prepared under commercial conditions as opposed to carefully controlled laboratory conditions. Table V illustrates the jet attrition loss, the abrasion loss and the water adsorption capacity of four samples of nodulized material from a commercial active alumina plant, two of which were cured by prior conventional air curing techniques and two of which were cured by immersion in water. All samples were activated at 750° F. The test procedures used were those outlined above with a minus ¼″ plus 8 mest size range being used for the jet attrition loss tests and plus 28 mesh material being used for the abrasion loss tests. As can be seen, samples 1 and 2 made according to the invention were superior in each of the categories.

It is apparent that various changes and modifications may be made without departing from the spirit of the invention. Accordingly, the scope of the invention should not limited except by the appended claims wherein:

What is claimed is:

1. A method of producing active alumina granules with high adsorption capacity comprising:
   (a) selectively calcining gibbsite alumina trihydrate to obtain a transition and amorphous alumina comprising in excess of about 95% chi-rho alumina, up to about 3% pseudoboehmite alumina and not more than about 2% gibbsite alumina and capable of at least partial rehydration;
   (b) agglomerating the selectively calcined alumina by mixing with water to produce granules of desired configuration;
   (c) curing the granules by immersion in water at a temperature in the range of 140°–212° F. for a period of time to partially rehydrate the alumina to produce a transition material comprising from about 46 to about 76% chi-rho alumina, from about 27 to about 42% pseudoboehmite alumina, from about 2 to about 7% bayerite alumina, with not more than traces of gibbsite alumina and not more than traces of nordstrandite alumina;
   (d) activating the alumina granules by heating at a temperature in the range of 350°–850° F. to obtain a transition alumina comprising from about 46 to about 76% chi-rho alumina, from about 9 to about 32% pseudoboehmite alumina, not more than about 40% eta alumina, not more than about 33% pseudo-gamma alumina and not more than traces of gibbsite alumina.

2. The method of claim 1 wherein the selectively calcined alumina is ground prior to agglomerating.

3. The method of claim 1 wherein the alumina granules are activated by heating at a temperature in the range of 550° to 750° F.

4. The method of claim 1 wherein the alumina granules are activated by heating at a temperature of about 600° F.

5. The method of claim 1 wherein the alumina granules are activated by heating at a temperature in the range of 700° to 850° F.

6. The method of claim 3 wherein the selectively calcined alumina is agglomerated by mixing with water to produce granules of from 6 to 8 mesh.

7. The method of claim 1 wherein the granules are cured by immersion in water at a temperature in the range of 140 to 176° F.

8. An active alumina with high adsorption capacity comprising:
   (a) from about 46 to about 76% chi-rho alumina;
   (b) from about 9 to about 32% pseudoboehmite alumina;
   (c) not more than about 40% eta alumina;
   (d) not more than about 33% pseudo-gamma alumina;
   (e) and not more than traces of gibbsite alumina.

(References on following page)

*Table V*

| | Curing Time, hrs. | Curing Temperature | Jet Attrition Loss, Percent | Abrasion Loss, Percent | Sorptive Capacity 60% R.H., Percent |
|---|---|---|---|---|---|
| (1) | 5 | 176° F (water) | 31.7 | 0.93 | 23.9 |
| (Control sample) | 24 | 77° F (ambient) | 97.0 | 2.1 | 22.1 |
| (2) | 24 | 158° F (water) | 57.3 | 1.9 | 25.2 |
| (Control sample) | 24 | 77° F (ambient) | 98.3 | 6.2 | 22.9 |

References Cited by the Examiner

UNITED STATES PATENTS

| | | | |
|---|---|---|---|
| 2,378,155 | 6/1945 | Newsome et al. | 23—143 |
| 2,405,275 | 8/1946 | Stowe | 23—141 |
| 2,478,675 | 8/1949 | Tamale et al. | 23—141 |
| 2,499,675 | 3/1950 | Owen | 23—142 XR |
| 2,876,068 | 3/1959 | Tertian et al. | 23—142 |
| 2,881,051 | 4/1959 | Pingard | 23—143 |

OTHER REFERENCES

Newsome et al.: "Alumina Properties," Technical Paper No. 10 (2d revision), Aluminum Co. of America, Pittsburgh, Pa., 1960, 88 pages (pages 33–45 and 49–51 of particular interest).

Tertian et al.: "Academic des Sceinces, Comptes Rendus," volume 236, 1953, pages 1565–1567.

Tertian et al.: "Journal de Chimie Physique," volume 55, May 1958, pages 341–353.

BENJAMIN HENKIN, *Primary Examiner.*

MAURICE A. BRINDISI, *Examiner.*